United States Patent
Kontola

(10) Patent No.: US 7,308,021 B2
(45) Date of Patent: Dec. 11, 2007

(54) METHOD IN THE SYNCHRONIZATION OF A RECEIVER, AND A RECEIVER

(75) Inventor: Ilkka Kontola, Julkujärvi (FI)

(73) Assignee: Nokia Corporation, Espoo (FI)

( * ) Notice: Subject to any disclaimer, the term of this patent is extended or adjusted under 35 U.S.C. 154(b) by 697 days.

(21) Appl. No.: 10/122,497

(22) Filed: Apr. 15, 2002

(65) Prior Publication Data

US 2002/0154681 A1   Oct. 24, 2002

(30) Foreign Application Priority Data

Apr. 20, 2001   (FI) .................................. 20010816

(51) Int. Cl.
*H04B 1/00* (2006.01)
(52) U.S. Cl. ..................................... 375/149
(58) Field of Classification Search ................ 375/147, 375/142, 143, 327, 343, 346, 368, 152, 149, 375/354, 357, 372, 373, 374, 369; 708/422, 708/423, 424, 426; 370/395.62, 507; 455/265; 702/89; 713/375, 400
See application file for complete search history.

(56) References Cited

U.S. PATENT DOCUMENTS

| | | | |
|---|---|---|---|
| 5,544,155 A | 8/1996 | Lucas et al. ................... | 370/18 |
| 5,798,732 A | 8/1998 | Eshenbach ................... | 342/357 |
| 5,943,606 A | 8/1999 | Kremm et al. ............. | 455/12.1 |
| 5,949,794 A | 9/1999 | Chiodini ..................... | 370/503 |
| 6,005,903 A | 12/1999 | Mendelovicz ................ | 375/367 |
| 6,044,074 A * | 3/2000 | Zehavi et al. ................ | 370/350 |
| 6,052,081 A | 4/2000 | Krasner ................... | 342/357.02 |
| 6,369,753 B1 * | 4/2002 | Schucker et al. ....... | 342/357.12 |
| 6,466,958 B1 * | 10/2002 | Van Wechel et al. ....... | 708/422 |
| 6,665,539 B2 * | 12/2003 | Sih et al. .................. | 455/456.3 |
| 6,873,649 B1 * | 3/2005 | Clark .......................... | 375/150 |
| 2001/0009563 A1 * | 7/2001 | Kohli et al. ................. | 375/150 |

FOREIGN PATENT DOCUMENTS

| | | |
|---|---|---|
| EP | 1107018 A2 | 6/2001 |
| EP | 1107018 A3 | 9/2003 |
| WO | WO 97/14057 | 4/1997 |
| WO | WO 97/37437 | 10/1997 |
| WO | WO 00/14566 | 3/2000 |
| WO | WO 00/35125 | 6/2000 |
| WO | WO 01/13537 A1 | 2/2001 |

OTHER PUBLICATIONS

European Search Report, EP 02 39 6055, Oct. 16, 2003.

\* cited by examiner

*Primary Examiner*—Sam K. Ahn
(74) *Attorney, Agent, or Firm*—Perman & Green, LLP

(57) ABSTRACT

In a method f or synchronizing a receiver with a signal modulated with a spreading code the frequency shift of the transmitted signal and the symbol acquisition of the data transmission are determined. In the method, a guessed data is generated, and the received signal is multiplied with at least two different values of said guessed data, to form spectrum results. The spectrum results formed with said different guessed data are used to determine the frequency shift.

11 Claims, 6 Drawing Sheets

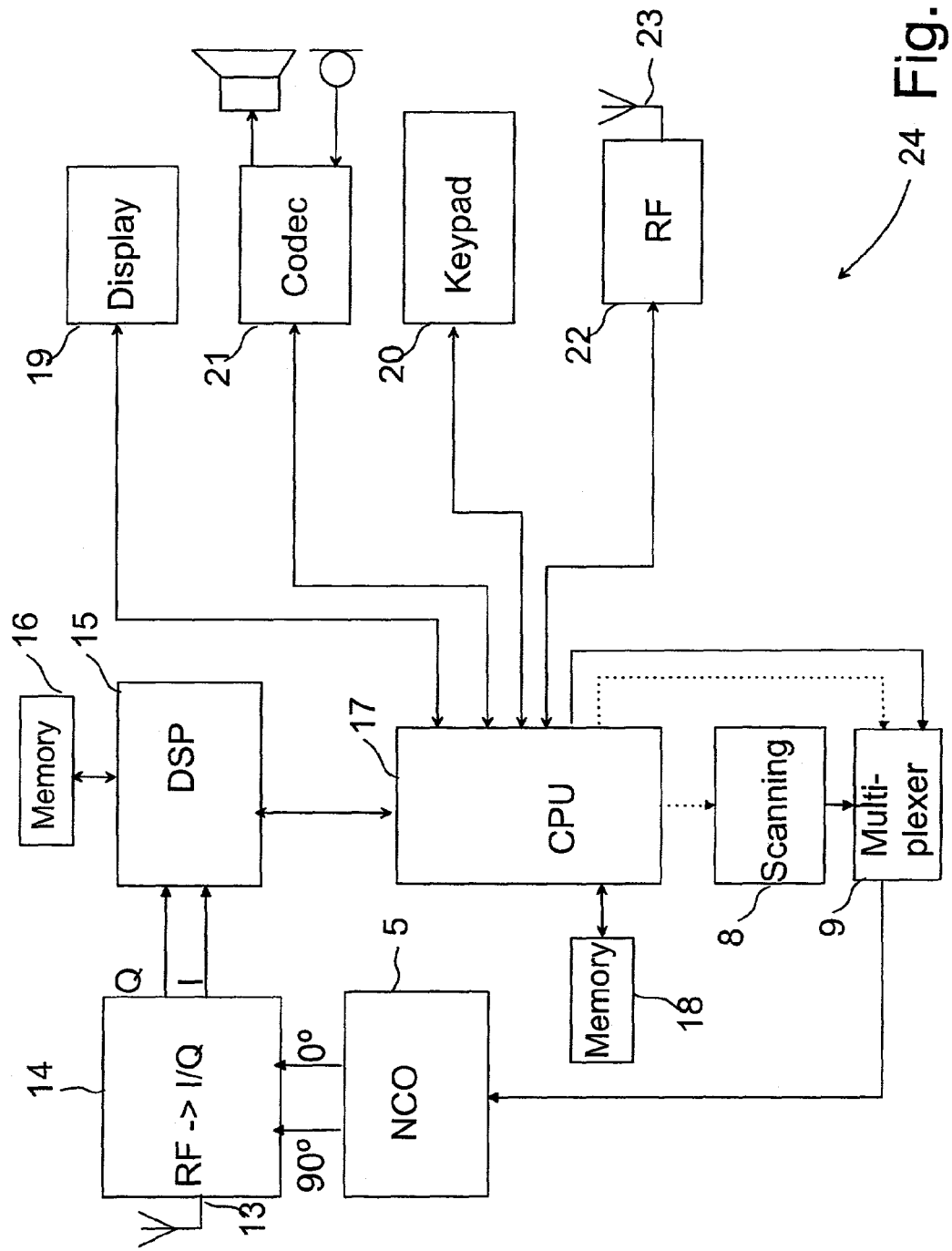

METHOD IN THE SYNCHRONIZATION OF A RECEIVER, AND A RECEIVER

FIELD OF THE INVENTION

The present invention relates to a method for synchronizing a receiver with a signal modulated with a spreading code, in which method the frequency shift of the transmitted signal and the symbol acquisition of the data transmission are determined. The invention also relates to a receiver comprising acquisition means for acquisition of a signal modulated with a spreading code, and determining means for determining the frequency shift of the signal and the symbol acquisition of the data transmission. The invention yet relates to a wireless communication device comprising at least one receiver which comprises acquisition means for acquisition of a signal modulated with a spreading code, and determining means for determining the frequency shift of the signal and the symbol acquisition of the data transmission.

BACKGROUND OF THE INVENTION

In positioning methods based on satellites, the positioning receiver attempts to receive a signal transmitted by the satellites. The signal contains phase-modulated information, such as the orbit parameters of the satellites. In practical situations, however, the signal strength in the positioning receiver may be so weak, particularly indoors, that acquisition of the signal is difficult. In particular, acquisition of a carrier wave modulated with a spreading code is complicated by 50 bps data transmission when operating at such signal levels on which data reception is impossible (and when the data must be obtained e.g. via a mobile communication network).

One known positioning system is the GPS system (Global Positioning System) comprising more than 30 satellites, of which normally a maximum of 12 are simultaneously within the sight of a receiver. These satellites transmit e.g. satellite orbit data (Ephemeris data) as well as data on the time of the satellite. A receiver to be used in positioning normally determines its position by computing the propagation time of a signal transmitted substantially simultaneously from several satellites belonging to the positioning system to the receiver. For positioning, the receiver must typically receive the signals of at least four satellites within sight, to be able to compute the position.

Each satellite operating in the GPS system transmits a ranging signal at a carrier frequency of 1575.42 MHz called L1. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo sequence. This pseudo sequence is different for each satellite. As a result of modulation, a code-modulated wideband signal is generated. The modulation technique used in the receiver makes it possible to distinguish between the signals transmitted by different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 MHz. The C/A code comprises 1023 chips, wherein the repetition interval (epoch) of the code is 1 ms. The carrier of the L1 signal is further modulated by navigation information at a bit rate of 50 bit/s. The navigation information comprises information about the "health" and orbit of the satellite, parameters related to the local clock of the satellite, etc. In satellites of the GPS system, e.g. so-called atomic clocks are used as the local clock.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which signals of more than four satellites can be received, the information received from different satellites can be weighted differently on the basis of the health data. Thus, it is possible to minimize the effect of errors on measurements, possibly caused by satellites which seem unreliable.

To detect the signals of the satellites and to identify the satellites, the receiver must perform acquisition, whereby the receiver searches for the signal of each satellite at the time and attempts to acquire this signal so that the signal propagation times can be measured and the data transmitted with the signal can be received and demodulated.

In receivers of prior art, the time taken for this acquisition depends, for example, on the strength of the received signal. Typically, the weaker the received signal is, the longer an integration must be carried out in each element of the space to be searched (correlation/frequency), to detect a possible signal. Typically, in prior art GPS receivers designed for outdoor use, the acquisition of satellite signals takes some tens of seconds or a few minutes, if the received signal strength is relatively high, in the order of −120 to −130 dBm. However, in a situation of positioning indoors or in such a place where the received signal is attenuated, for example, by the effect of buildings or other obstacles in the terrain, the acquisition time is considerably prolonged.

In the GPS system, the satellites transmit a spread spectrum modulated signal which is generated with an individual spreading code in each satellite. Thus, the receiver attempts to be synchronized with the transmitted signal, i.e., the receiver attempts to determine the code phase and Doppler shift of the signal. In practice, the Doppler shift can be in the order of ±6 kHz. In a corresponding manner, the length of the code used in the modulation is 1023 chips, wherein 1023 different alternatives must be scanned to find out the correct code phase. Thus, scanning through the whole two-dimensional search space takes a long time. Furthermore, the determination of the correlation maximum is complicated by the fact that the spread spectrum modulated signal is still modulated with a data signal of 50 baud. Due to the effect of the unknown data modulation, the inaccuracy of the frequency estimate is several tens of hertzes, and the measurement result is thus not directly suitable to be used as an initialization for the carrier wave tracking phase locked loop.

Consequently, in this description, the spreading code refers to a code with which the carrier wave is modulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. Also in urban areas, buildings have an effect on the signal to be received.

The positioning arrangement has two primary functions:
1. to calculate the pseudo range between the receiver and the different GPS satellites, and
2. to determine the position of the receiver by utilizing the calculated pseudo ranges and the position data of the satellites. The position data of the satellites at each time can be calculated on the basis of the Ephemeris and time correction data received from the satellites or via the mobile communication network.

Distances to the satellites are called pseudo ranges, because the time is not accurately known in the receiver from the beginning. Thus, the determinations of position and time are iterated until a sufficient accuracy is achieved with respect to time and position. Because the time is not known with absolute precision, the position and the time must be determined by iteratively solving a linearized set of equations having x,y,z and time as unknowns.

The pseudo range can be computed by measuring the pseudo transmission time delays between the signals of the different satellites.

Almost all known GPS receivers utilize correlation methods for computing the distances. In a positioning receiver, pseudo sequences of different satellites are stored or generated locally. A received signal is subjected to conversion to an intermediate frequency (down conversion), whereafter the receiver multiplies the received signal with the stored pseudo sequence. The signal obtained as a result of the multiplication is integrated or low-pass filtered. The presence of the satellite signal can be determined on the basis of this filtered or integrated signal.

The above-mentioned acquisition and frequency control process must be iterated for each signal of a satellite received in the receiver. Consequently, this process takes a lot of time, particularly in a situation, in which the signals to be received are weak. To speed up this process, some prior art receivers use several correlators, wherein it is possible to search for several correlation peaks simultaneously. In practical solutions, the process of acquisition and frequency control cannot be accelerated very much solely by increasing the number of correlators, because the number of correlators cannot be increased infinitely.

In some prior art GPS receivers, thee FFT technique has been used in connection with conventional correlators to determine the Doppler shift of the received GPS signal. These receivers use the correlation to restrict the bandwidth of the received signal to 10 to 30 kHz. This narrow-band signal is analysed with FFT algorithms to determine the carrier frequency.

International patent application WO 97/14057 presents a GPS receiver and a method for processing GPS signals. The receiver presented in this reference comprises primarily two separate receivers, of which the first receiver is intended for use in a situation in which the received signal strength is sufficiently high, and the second receiver is intended for use in a situation in which the received signal strength is not sufficient for sufficiently accurate positioning by using the first receiver. In this second receiver, the received signal is digitized and stored in memory means, wherein these stored signals are later used in a digital signal processor. The digital signal processor performs convolution operations on the received digitized signal. The aim of these convolution operations is to calculate the pseudo distances. Typically, 100 to 100 epochs (PM frames) are stored in the memory means, corresponding to a signal with the length of 100 ms to 1 s. After this, the stored code corresponding to the code of the satellite under examination is retrieved from the memory of the receiver for use in the analysis of the received signal.

Also the Doppler shift is removed in the receiver. The extent of this Doppler shift is determined either in the first receiver or on the basis of data received from a base station belonging to the GPS system. This is followed by coherent summing of sequential frames. This data obtained as a result of the summing is subjected to fast Fourier transform. The Fourier transform result is multiplied by the complex conjugate of the Fourier transform of the reference signal stored in the memory means. This product of the multiplication is further subjected to inverse Fourier transform, producing a set of correlation results. Consequently, in this reference, the correlation is replaced by the Fourier transform, thereby reducing the number of arithmetical operations. According to the reference, the method accelerates the positioning 10 to 100 times compared with the solutions known at the time of filing of said publication.

SUMMARY OF THE INVENTION

It is an aim of the present invention to provide a method for synchronizing a receiver with a spread spectrum modulated signal, to accelerate acquisition of the phase of the carrier wave. The invention is based on the idea that the spectrum widening due to the unknown data modulation can be cancelled out by guessing the original data. When the data in values of 1 and −1 is multiplied with the successfully guessed, i.e. the same data, the effect of the data on the signal is cancelled. (1×1=1 and −1×−1=1). This is preferably performed by trying all the possible bit combinations, if necessary, with data bit patterns of certain length, and furthermore, with different phases of the data bit patterns, until achieving as high and narrow a spectrum peak as possible. Thus, the effect of the data modulation is eliminated, and a more accurate frequency estimation is possible. More precisely, the method according to the present invention is primarily characterized in that in the method, guessed data is formed, and the received signal is multiplied with at least two different values of said guessed data to form spectrum results, wherein the frequency shift is determined on the basis of the spectrum results formed with said different guessed data. The receiver according to the present invention is primarily characterized in that the receiver also comprises means for generating guessed data, means for multiplying the received signal with at least two different values of said guessed data to form spectrum results, and means for determining the frequency shift on the basis of the spectrum results formed with said different guessed data. Further, a wireless communication device according to the present invention is primarily characterized in that the wireless communication device also comprises means for generating a guessed data, means for multiplying the received signal by at least two different values of said guessed data to form spectrum results, and determining means for determining the frequency shift on the basis of the spectrum results formed with said different guessed data.

The present invention shows remarkable advantages compared to solutions of prior art. When applying the method according to the invention, the acquisition of the phase of the carrier of the satellites by the receiver can be considerably speeded up. Thus, also the positioning can be performed faster. By the method according to the invention, it is also possible to reduce the total energy consumption of the receiver, which is significant particularly in portable devices. This is based on the fact that the time taken to the phase acquisition is shorter.

DESCRIPTION OF THE DRAWINGS

In the following, the invention will be described in more detail with reference to the appended drawings, in which.

DETAILED DESCRIPTION OF THE INVENTION

In the following, the invention will be described by using the GPS system and a GPS receiver as examples of a positioning system and a positioning receiver, respectively, but it is obvious that the present invention can also be applied in connection with other positioning systems and communication systems, in which the aim is to acquire a transmitted signal in a receiver.

Figure 1:
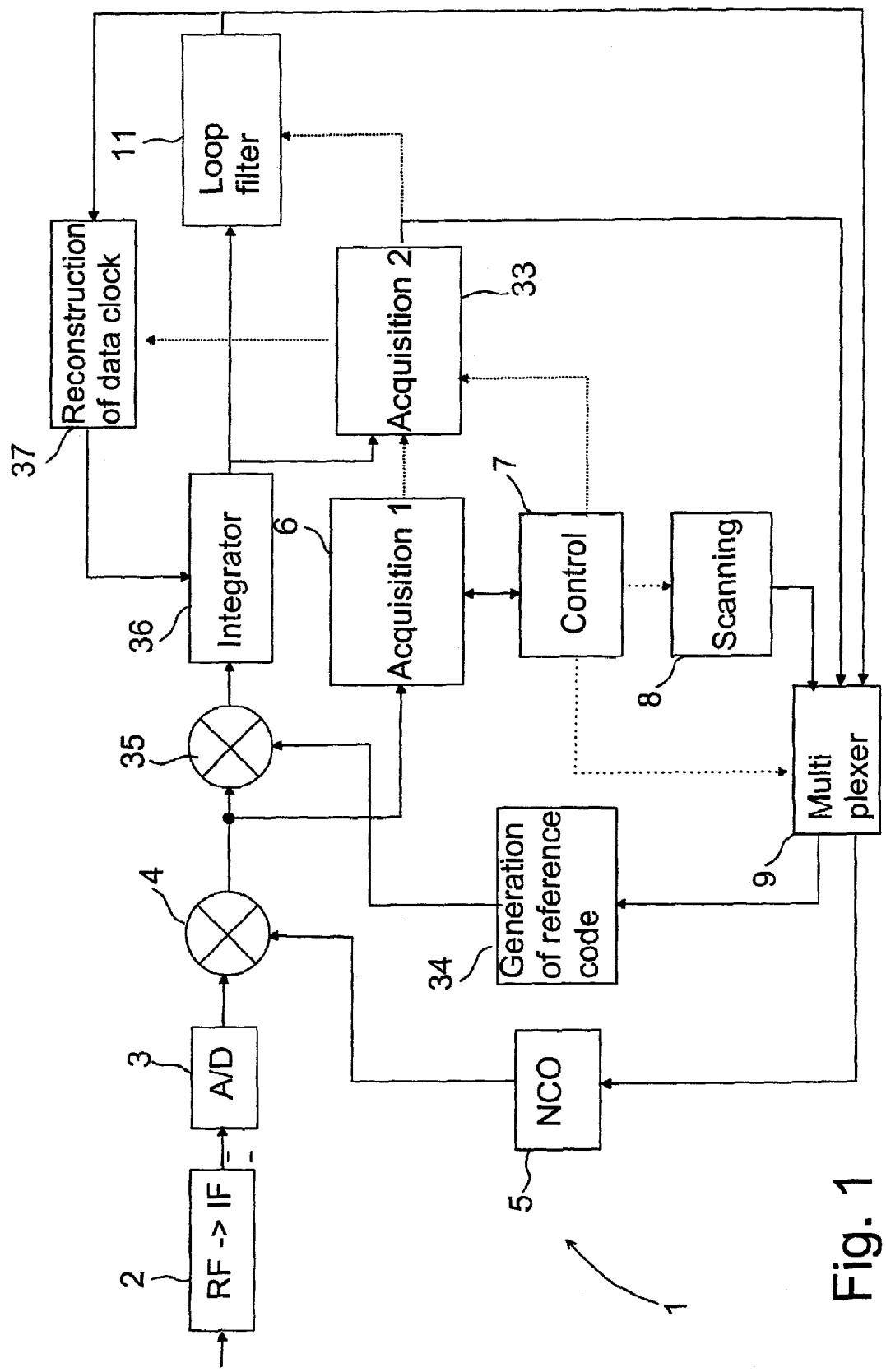
FIG. 1 shows a receiver according to a preferred embodiment of the invention in a reduced block chart.

In a receiver 1 according to a preferred embodiment of the invention, shown in FIG. 1, the received signal is preferably converted to an intermediate frequency in a converter block 2. At this stage, the signal comprises two components, known as such: the I and Q components, with a phase difference of 90° therebetween. These analog signal components converted to an intermediate frequency are digitized in a digitization block 3 and led to a first multiplier block 4. In the first multiplier block 4, the I and Q components of the digitized signal are multiplied by a signal generated by a numerically controlled oscillator (NCO) 5. This signal of the numerically controlled oscillator 5 is intended to correct the frequency deviation caused by the Doppler shift and the frequency error of the local oscillator (not shown) of the receiver 1. In this preferred embodiment of the invention, the signal generated by the first multiplier block 4 is led to an acquisition block 6. The aim of this acquisition block 6 is thus to find the code phase of the satellite and at least a rough frequency deviation, which is followed by a second acquisition step in the method according to the invention. Also this will be described below in this description. During the acquisition, a control block 7 is used to control a scanning block 8, by means of which the frequency of the numerically controlled oscillator 5 is adjusted, if necessary. The control block 7 controls a selection block 9 to couple this signal formed by the scanning block 8, during this acquisition step, to the numerically controlled oscillator 5, the control signal formed by a precision acquisition block 33 during the second acquisition step to the numerically controlled oscillator 5, or the control signal formed by the loop filter 11 to the numerically controlled oscillator 5, after the acquisition has been made. Preferably, the precision acquisition block 33 is used to control the operation of this loop filter 11. This loop filter 11 forms a part of the code phase locked loop, known as such, and the carrier phase locked loop. In the second multiplier block 35, the received signal and the reference code are multiplied. The signal output from the second multiplier block 35 is led to an integrator 36. The signal output from the integrator 36 is further led to a precision acquisition block 33.

Figure 2:
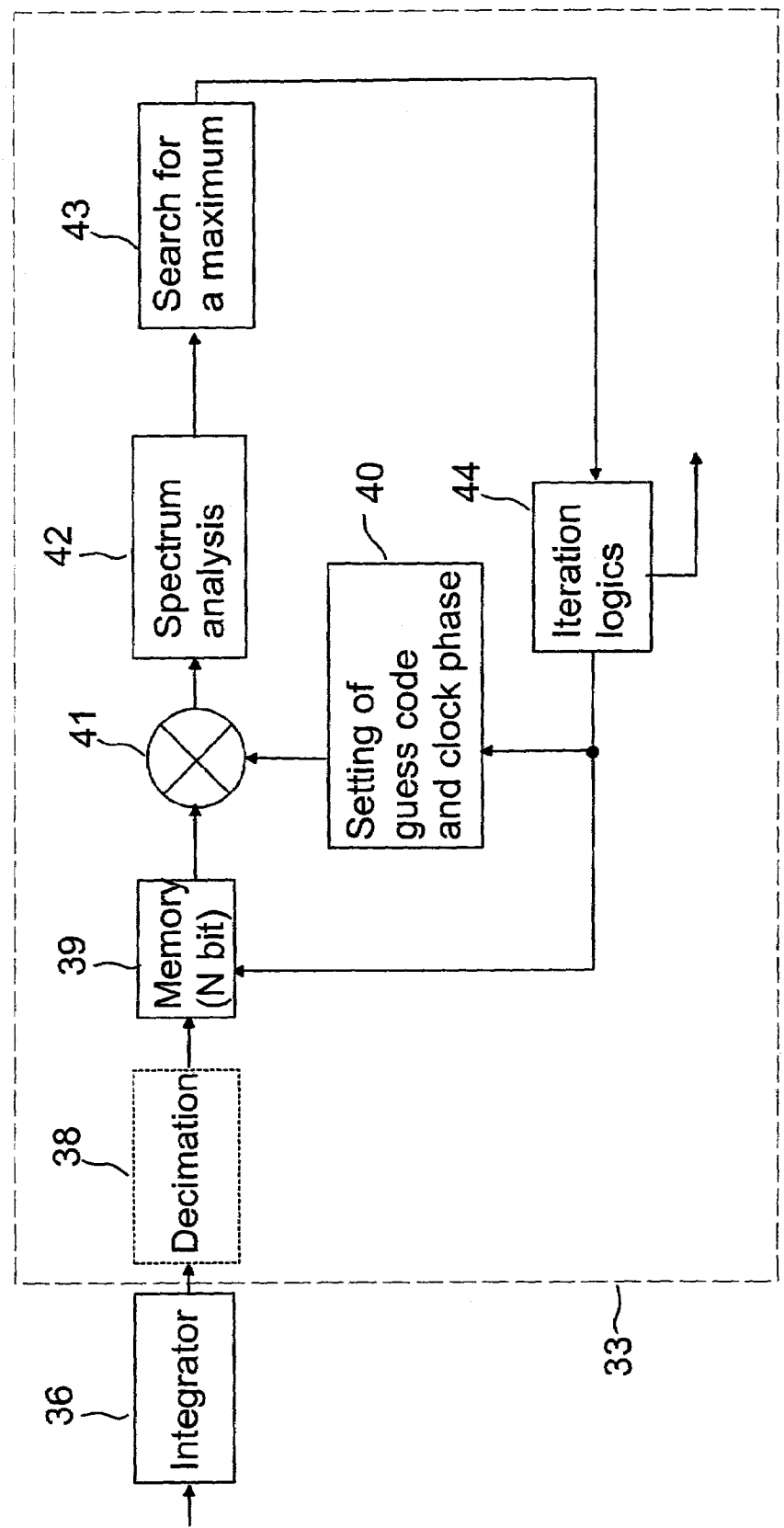
FIG. 2 shows a precision acquisition block in a receiver according to a preferred embodiment of the invention in a reduced block chart.

FIG. 2 shows, in a reduced block chart, the structure of the precision acquisition block 33 of the receiver according to a preferred embodiment of the invention. It preferably comprises an optional block 38, memory means 39, a guessed data block 40, a second multiplier block 41, a spectrum analysis block 42, a search block 43, and an iteration block 44. The structure of this precision acquisition block 33 will be described in more detail further below in this description.

For applying the present invention, the receiver 1 must first determine the code phase and the rough carrier frequency. This can be performed by a method known as such or, for example, in the following way.

After turning on the operating voltages, or in a situation in which the receiver 1 has not been capable of receiving the signal of GPS satellites for a long time, the receiver 1 performs a two-dimensional searching step for each satellite whose signal is to be received. In this two-dimensional searching step, the aim is to determine the carrier frequency and code phase for each satellite. The carrier frequency is thus affected by the Doppler shift caused by the movement of the satellite, as well as by inaccuracies in the local oscillator of the receiver. The frequency uncertainty may be relatively high, even ±6 kHz, wherein the receiver 1 must scan a frequency range of about 12 kHz in relation to the actual transmission frequency (L1=1575.42 MHz). Moreover, the receiver 1 does not know the precise code phase, wherein the receiver must also determine the code phase from 1023 possible code phases. This will result in a two-dimensional search process, in which one dimension is the frequency deviation in the range of 12 kHz and the second dimension is the code phase from 1023 different code phases. In the method according to a preferred embodiment of the invention, it is possible to scan a frequency range of about 500 Hz at a time, wherein the method is iterated, if necessary, 24 times to cover the whole frequency range of 12 kHz to be scanned. It is obvious that the example values in this description are only used to clarify the invention, but not as restricting examples. The invention can also be applied in systems other than GPS systems, wherein e.g. said frequency values, code phases and the number of codes may vary.

The following is a description of the operation of the method according to a preferred embodiment of the invention in a receiver 1 as shown in FIG. 1. To begin with, a first acquisition step is taken to determine the frequency deviation and the code phase in such a way that the frequency accuracy is in the order of some tens of hertzes and the possible phase error is preferably smaller than the length of one chip. This first acquisition step is described in more detail in a previous Finnish patent application FI-19992653 by the applicant, which is incorporated herein by reference. To start the acquisition, the scanning block 8 sets the frequency of the numerically controlled oscillator 5 so that the receiver 1 preferably receives the lowest frequencies in the frequency range, in this example from 1575.414 MHz to 1575.4145 MHz. The receiver may also determine the starting frequency so that the receiver utilizes e.g. previously determined position data and/or almanac data, wherein the positioning can be further accelerated. Samples of the received signal are preferably stored as complex sample vectors which each comprise 1023 samples in this preferred embodiment. The frequency of storing the samples in this preferred embodiment is substantially the same as the chipping rate, i.e. about 1,023,000 samples per second. The sample vectors are continuous so that the next sample vector continues, in time, after the previous sample vector, i.e. the time difference between the last sample of a sample vector and the first sample of the next sample vector is substantially the same as the time difference between successive samples in the sample vector. Thus, these 1023 samples represent a signal with the length of about 1 ms, wherein in the time-to-frequency conversion, the frequency range is about 1 kHz, of which a part can be utilized.

The number of sample vectors is preferably N, in which N is preferably a power of two. Furthermore, the formation of sample vectors is iterated K times in the preferred embodiment of the invention. When determining the value of the number N of the sample vectors in the GPS system, one must take into account that the signal contains information modulated at a bit rate of 50 bits/s by binary phase modulation. Another factor limiting this number N of sample vectors is the frequency stability of the local oscillator of the receiver.

In addition to the step of forming the sample vectors, in the acquisition method according to the invention, a correlation step is taken to form a correlation function matrix.

This correlation step can be taken partly already during the sampling, or after the formation of N number of sample vectors. If the correlation step is taken e.g. so that, after the storage of each sample vector, a time-to-frequency conversion is computed for it, such as a fast Fourier transform (FFT), the same time-to-frequency converter can be used for all N sample vectors. However, if the correlation step is taken after the storage of the N sample vectors, either a separate time-to-frequency converter must be used for each sample vector, or the time-to-frequency conversions are performed for the different sample vectors one after the other in the same time-to-frequency converter. In this description, the Fourier transform and the inverse Fourier transform are primarily used as examples of the time-to-frequency conversion and the inverse conversion, i.e. frequency-to-time conversion, respectively; however, it is obvious that the present invention is not limited solely to these examples.

Each sample vector is subjected to discrete Fourier transform 102, preferably fast Fourier transform (FFT). In arithmetic operations in practice, preferably 1024 values are used, because the discrete Fourier transform can thus be implemented in a considerably more efficient way in practical applications (with the FFT algorithm) than when using 1023 values. One way of providing this is to add an extra zero to 1024 elements, or to take the samples so that the complex sample vectors have 1024 samples instead of 1023 samples, the sampling time being, however, substantially the same. This has a minor effect on the transform result.

The receiver preferably contains the stored reference codes r(x) corresponding to the C/A codes for all the satellites (not shown) in the GPS system, wherein x refers to the satellite index, for example x ranges from 1 to 36. The reference codes do not necessarily need to be stored but they can also be generated in the receiver. At the correlation stage, the reference code of the satellite which transmitted the signal to be acquired by the receiver is selected or generated. The reference code is preferably inverted in time. This inverse reference code is subjected to discrete Fourier transform, preferably fast Fourier transform. The inverse reference code and/or its fast Fourier transform may already have been stored in advance in the memory means of the receiver, or it is formed from the reference code r(x) in connection with the acquisition.

In the next correlation step, the Fourier transform result of each sample vector is multiplied with the Fourier transform result of the inverse reference code. These products of the multiplications are further subjected to inverse Fourier transform, wherein the result is a cross correlation of the reference code r(x) and the received signal with all possible integer delays (1023). This is based on the fact that the Fourier transform of the convolution of the signals in the time domain corresponds to the multiplication of the Fourier transformed signals, i.e. signals of the time domain converted to the frequency domain. As also the inverse reference code is used, the Fourier transform can be used to perform a fast correlation in discrete time. Thus, in this preferred example, the cross correlation result comprises 1023 elements. These cross-correlation results formed of different sample vectors are compiled to a correlation function matrix, in which the number of rows is the number N of the sample vectors.

It is obvious that, instead of inversion of the reference code in time, inverse sample vectors can be formed of the sample vectors, wherein the reference code r(x) is used directly and inverse sample vectors are used in the above-presented arithmetic operations. In an advantageous embodiment, neither of the above-mentioned inversions needs to be made, that is, the reference code r(x) and the sample vectors can be used as such. This is based on utilizing the property of the correlation theorem which indicates that the cross-correlation corr($z_1$, $Z_2$) between two time discrete functions $z_1$, $Z_2$ can be formed by means of a time-to-frequency conversion of the functions converted to the frequency domain.

In this context, it should be pointed out that the method presented in the preceding paragraph for calculating the cross-correlation between the sample vectors and the reference code r(x) is due to the basic properties of the correlation and the convolution as well as their close dependence, wherein the inversion of the function in the time domain has, practically, a mathematical correlation to the formation of the complex conjugate in the frequency domain. It should also be pointed out that in view of applying the present invention as a whole, the method used for producing the cross-correlation result is not significant as such.

The rows in the correlation function matrix formed in the correlation step represent the cross-correlation of the received signal and the reference code with various phase differences taken at intervals of one millisecond. In the next step, the transposition of the correlation function matrix is used, in which the rows represent the signal samples in the time domain in the same way as in a correlator according to the prior art. Each row corresponds to a specific code phase difference between the received signal and the reference code. Each row of the transposition of this correlation function matrix is subjected to the Fourier transform to form a search matrix, wherein a frequency analysis can be performed to determine the real frequency shift.

In practical applications, a separate transposition matrix does not need to be formed from the correlation function matrix, but the elements of the stored correlation function matrix are read from a memory 16 (FIG. 5) in a different direction, preferably in columns.

The correlation function matrix can also be formed e.g. by using matched filters, known as such.

However, as stated above, the signal is modulated in the GPS system with a signal of 50 bit/s, which may restrict the value of the number N in practical applications. Thus, the number N must be selected preferably so that the modulation will not substantially affect the analysis. Furthermore, the optimum N value is affected by the window function used in the Fourier transform. By selecting e.g. N=32 as the numerical value, the width of the noise band obtained for the receiver is in the order of 30 Hz, which is still slightly too high for demodulating signals whose strength is in the order of −150 dBm in the receiver. For this reason, the acquisition block 6 still comprises an optional incoherent summing step to improve the signal-noise ratio.

To implement the incoherent summing step, the above-presented steps of sample vector formation, correlation and analysis are iterated K times. This number K of iterations is preferably selected so that the signal-noise ratio can be improved to a sufficient degree but within a reasonable time. At each time of performing the analysis, one coherent search matrix is formed, for which the incoherent summing is performed to form an incoherent search matrix. The incoherent search matrix is preferably formed in the following way. From the complex elements of each coherent search matrix, preferably the magnitude (absolute value) or another numerical value is calculated, such as the second power of the magnitude of the element. The numerical values calculated from the corresponding elements of the incoherent search matrix are summed up, i.e. the matrices are summed up.

In practical solutions, the incoherent search matrix can be formed in at least two ways. In the first implementation alternative, the coherent search matrix formed at each iteration time is stored. After the necessary iterations, the incoherent search matrix is formed by summing up the corresponding elements according to Formula 8. In this implementation alternative, a memory is needed for storing all the elements of the coherent search matrices. According to the second implementation alternative, one coherent search matrix is first calculated, whose values are copied as elements of the sum matrix. Each next iteration time, a coherent search matrix is formed, whose values are added to the corresponding elements in the incoherent search matrix. In this alternative, the summation of the corresponding elements is thus performed each iteration time. Thus, only one coherent search matrix is stored, wherein less memory space is required than in the first alternative.

The necessary iterations are followed by an analysis step to examine the values of the elements of this incoherent search matrix and to find a value which exceeds a predetermined threshold value and is clearly higher than the other values. If such a value is found, it indicates the code phase difference as well as the frequency deviation in the first acquisition step with a desired accuracy, because it is probably a signal transmitted by a satellite. If the signal is not transmitted by a satellite but noise or another spurious signal, no significant correlation peaks should occur. The code phase difference and the frequency difference are manifested by the line index and the column index of this highest value, respectively. However, if no such value is found in the incoherent search matrix, i.e. a signal transmitted by the searched satellite was probably not received in the frequency range under examination, the frequency band under examination is changed and the above-presented steps are taken to form an incoherent search matrix. By this method, the whole range of 6 kHz under examination can be scanned by iterating the above-presented steps a sufficient number of times.

If necessary, the above-presented steps can be iterated for the whole frequency band under examination, storing the incoherent search matrices formed at the different iteration times, or only the possible peaks, before searching for the highest correlation peak. In this way, the possibility of misinterpretations can be reduced e.g. in such a situation in which the threshold value is set too low and a spurious signal can cause a misinterpretation.

The steps of finding a signal of a satellite in the acquisition block 6 and determining the code phase and an approximate frequency deviation are followed by the second acquisition step applying the method of the invention. In this second acquisition step, the aim is to further improve the accuracy of the frequency deviation estimate. For this purpose, the control block 7 sets the precision acquisition block 33 to fine-tune the frequency and the code phase. On the basis of the results of the first acquisition step in the acquisition block 6, the control block 7 sets the numerically controlled oscillator 5 to the value indicated by the determined frequency deviation. Furthermore, the reference code corresponding to the code used by the satellite is set in the reference code generator 34. On the basis of the code phase data determined in the acquisition block 6, the code phase of the reference code is set correct. After this, the signal transmitted by the satellite is received and led not only to the first conversion block 2, the digitizing block 3 and the first multiplier block 4, but also to a second multiplier block 35. In the second multiplier block, the received signal is multiplied with the reference code, wherein the output of the second multiplier block 35 contains information modulated in the signal transmitted by the satellite, if the frequency and the code phase are correct. For fine-tuning of the frequency and the code phase, the signal output from the second multiplier block 35 is led to an integrator 36. In this embodiment, the signal formed in the second multiplier block 35 is integrated in the integrator 36 for a maximum time of one data bit, which is about 20 ms in the GPS system. Consequently, it is a so-called integrate-and-dump type filtering. This output signal is further led to the precision acquisition block 33, which, if necessary, performs signal decimation in the optional block 38. The purpose of this decimation is to reduce the quantity of data to be stored in the second acquisition step. The integrator signal or the decimated integrator signal is led to memory means 39 for storage. A certain number of samples taken of the signal are stored in the memory means 39, after which a data modulation is performed for a more precise determination of the frequency deviation and the clock phase.

The data modulation is preferably performed in the following way. A guessed data block 40 forms the guessed data (bit pattern) to be used in the acquisition and sets its phase. In this example, it is assumed that the length of the guessed data is selected to be four bits, but in practical applications, the length of the guessed data can be longer or shorter than said four bits. Preferably, the length of the guessed data ranges from six to twelve bits. Furthermore, it is assumed that four different clock phases are examined, but in practice, the number of clock phases to be examined may vary, and preferably it ranges from four to six phases. Thus, in this description, the number of combinations of a bit pattern and a clock phase to be examined is sixteen, and in practical applications, with the above-presented numerical values, it preferably ranges from 256 to 1536 different combinations. Naturally, this number of combinations may be even higher, particularly if the processing capacity of the receiver is sufficient to perform the required arithmetic operations in such a way that the correct code phase can be determined sufficiently fast, preferably in a few hundred milliseconds. After setting the first alternative bit pattern, e.g. 1111, and the first code phase for the guessed data in the guessed data block 40, this guessed data and the sample sequence stored in the memory 39 are multiplied in the second multiplier block 41. Thus, the output of the second multiplier block has a discrete signal in the time domain, which is analysed in a spectrum analyzing block 42. In the spectrum analyzing block 42, a time-to-frequency conversion is preferably performed, such as the discrete Fourier transform (DFT) or fast Fourier transform (FFT). It is obvious that also other time-to-frequency conversions can be applied in this context. In the search block 43, peaks are searched in the signal formed by the spectrum analyzing block 42, and the highest peak found is preferably stored. Furthermore, from the signal formed by the spectrum analyzing block 42, also other variables can be determined, which represent the properties of the signal formed by the spectrum analyzing block 42, such as the ratio between the highest maximum to the second highest maximum, the number of maxima, or corresponding information whereby the signal spectrum can be evaluated and compared. After this, the guessed data block 40 selects, for example, the next clock phase for the guessed data to be used in the acquisition, e.g. the value 111⁻1, after which a new multiplication is performed in the second multiplier block 41 between the guessed data and the output signal of the integrator. The multiplication product is led to the spectrum analyzing block 42 again, after which the search block 43 analyzes the signal formed by the spectrum analyzing block 42. At this stage, the analysis performed at preceding acquisition times can be compared in the search block 43 to evaluate if the spectrum of the signal obtained at this search time is better than the spectrum of the signals formed at the preceding acquisition times. In this evaluation, it is possible to utilize the highest maximum of the signal formed at each acquisition time, wherein preferably the highest of these maxima primarily indicates the correct result.

Figure 4A:
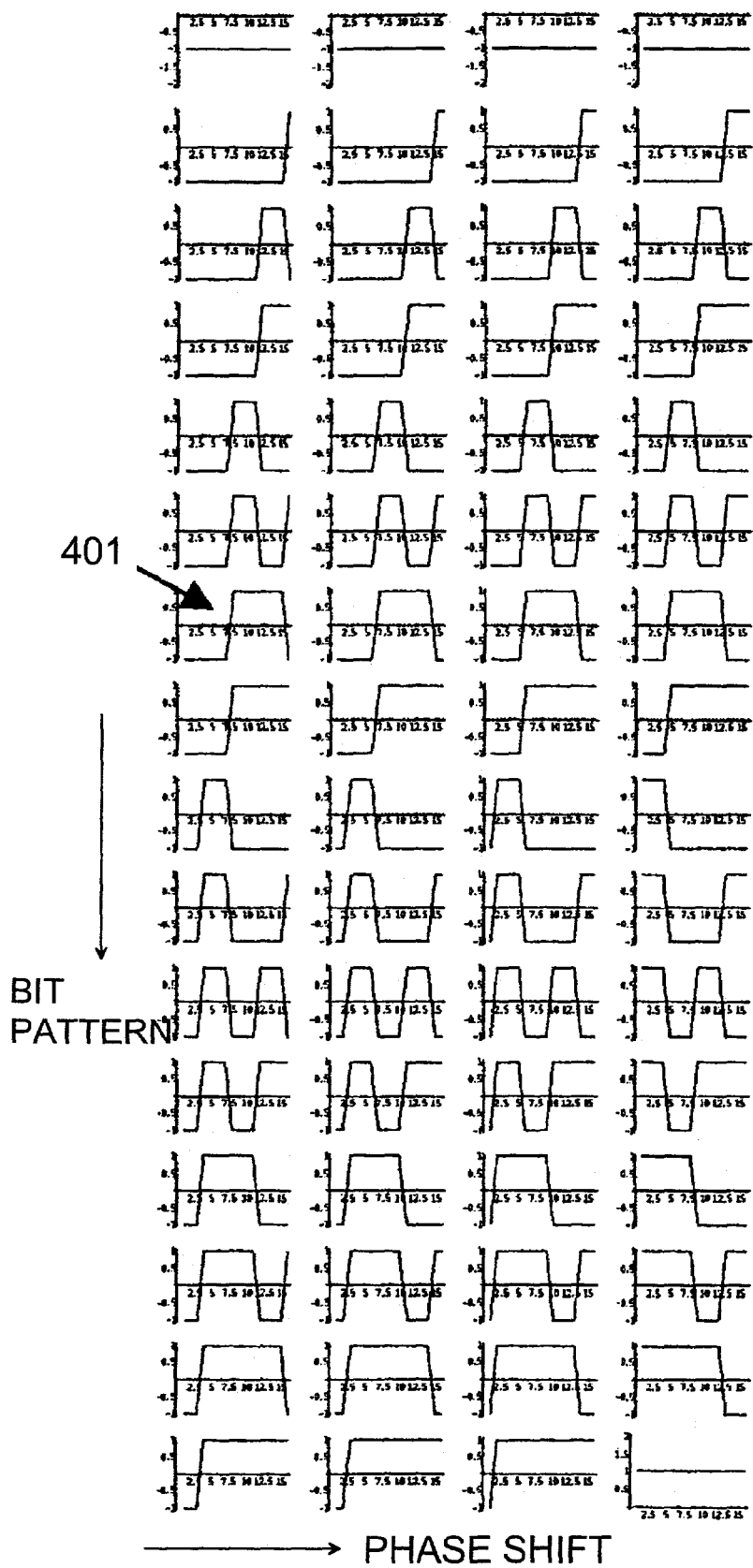
FIG. 4a shows, as an example, data guesses formed by the method according to the invention.
Figure 4B:
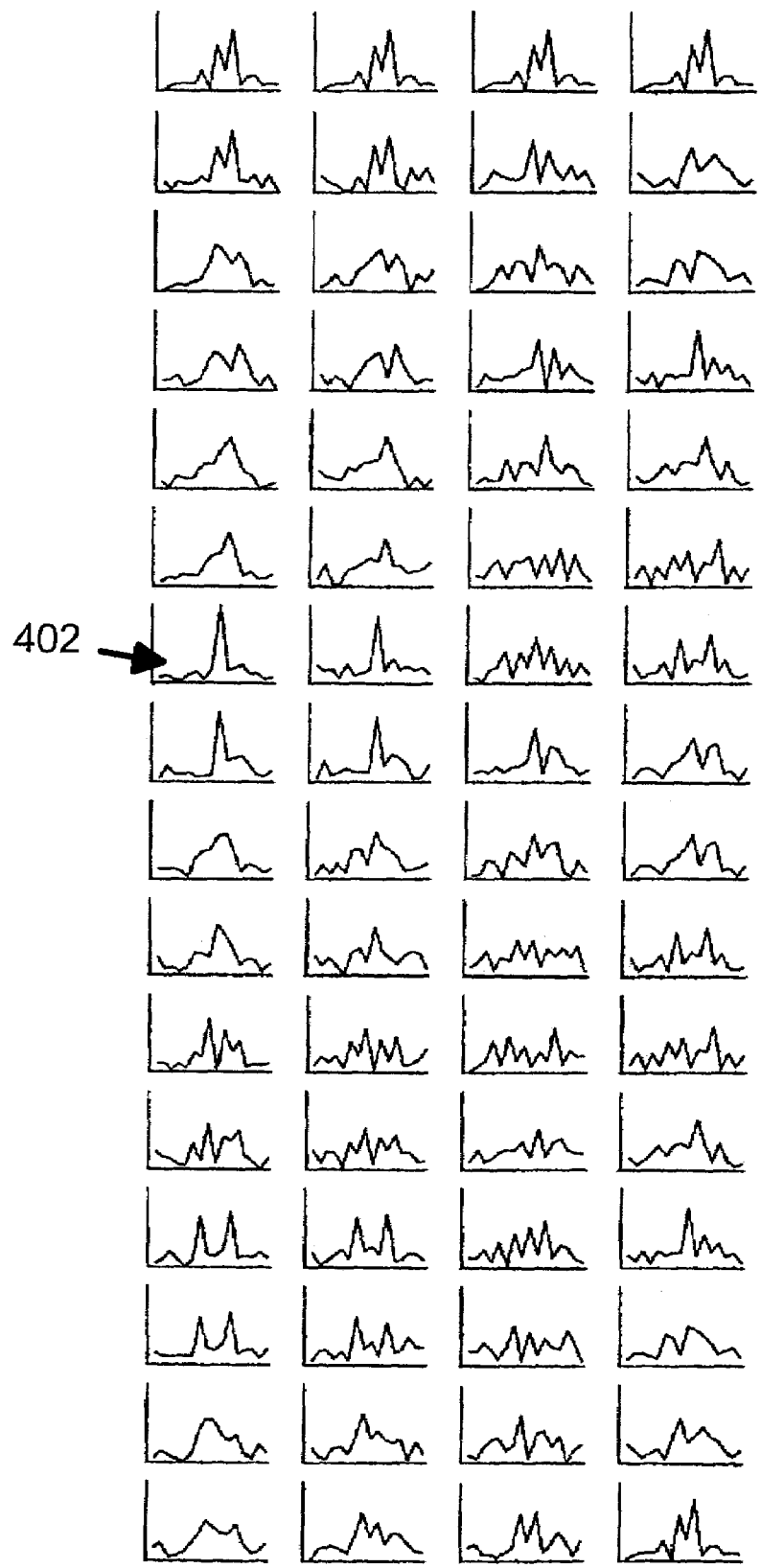
FIG. 4b shows, as an example, spectra resulting from the data guesses of FIG. 4a, and FIG. 5 shows an electronic device according to a preferred embodiment of the invention in a reduced block chart.

After scanning through all the possible clock phases, the iteration block 44 controls the guessed data block 40 to set the next bit pattern in the guessed data and the first clock phase as the clock phase. After this, the steps of multiplication, spectrum analysis and searching are performed again, as presented above. These steps are iterated, until all the possible bit combinations and clock phases with each bit combination have been scanned. At this stage, the search block 43 has information about the bit combination and clock phase which yielded the best spectrum. On the other hand, the invention can also be applied by storing the spectrum obtained with each bit combination and clock phase, and by analysing and comparing the stored spectra after scanning through all the possible combinations. However, this latter alternative requires considerably more memory space than the above-described alternative, in which only the highest maximum determined from the examined spectra is stored each time. The location of this highest maximum will now indicate which bit pattern is probably the correct one and also what is the correct clock phase. Thus, from this clock phase, it is also possible to determine the deviation of the reference clock from the correct time used in the satellites. FIGS. 4a and 4b show an example of the data guesses to be applied in the method according to the invention and the spectrum results to be obtained by means of them. In FIG. 4b, arrow 402 indicates the best result to be obtained in the situation of this example, and in a corresponding manner, in FIG. 4a, arrow 401 indicates the guessed data used to achieve this best result.

After performing the precision acquisition, the numerically controlled oscillator 5 is set to the correct frequency, and the reference code generator 34 is set to correspond to the code used by the satellite to be received. After this, it is possible to start signal reception and demodulation.

It is obvious that the guessed data block 40 can also perform the code generation in such a way that all the possible bit combinations are first generated with one clock phase, after which the clock phase is changed and all the bit combinations are formed again with this clock phase, until all the combinations have been scanned.

Figure 3:
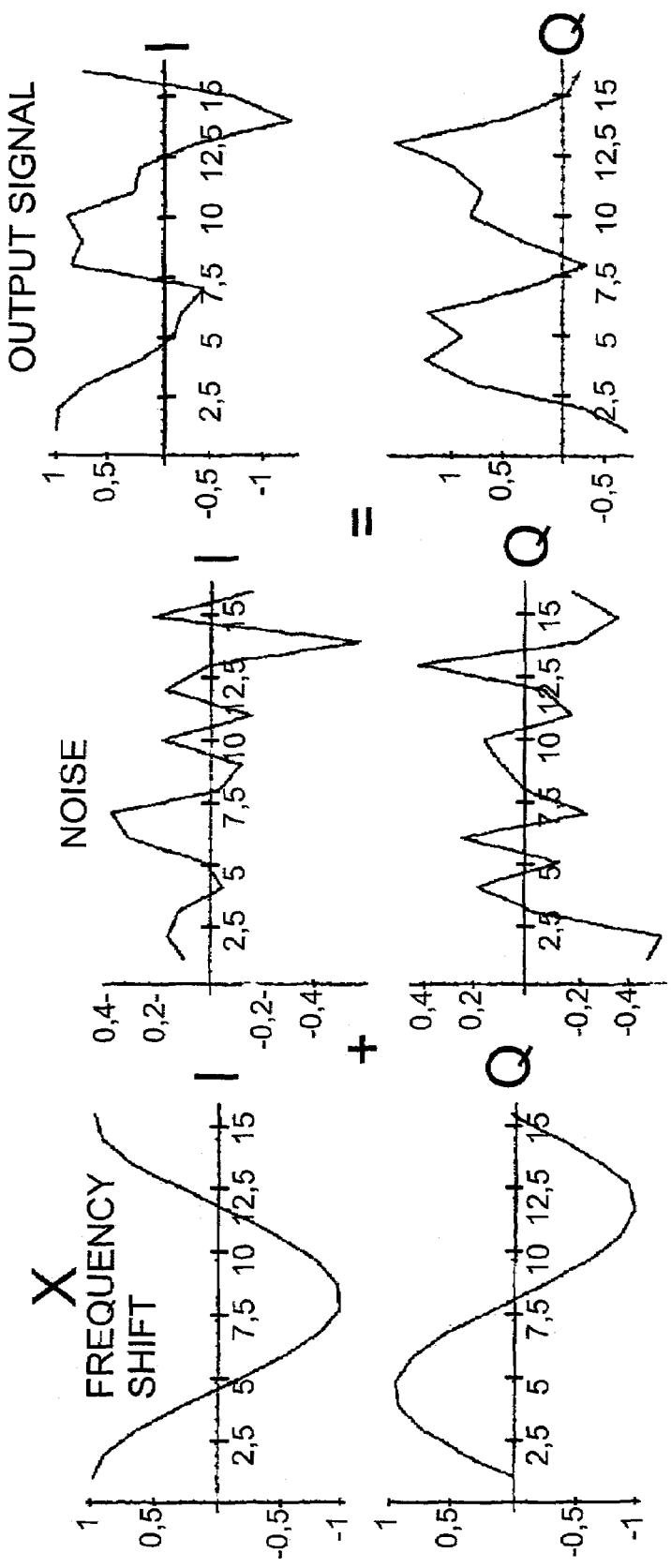
FIG. 3 illustrates the generation of an output signal from an integrator in a reduced view.

With the above-presented method it is possible to further define the frequency deviation of the received signal as well as the symbol clock. After acquisition in the acquisition block 6 or in another way, there may still be a frequency deviation of some tens of hertzes by the effect of data modulation. The signal output from the integrator may thus contain a signal similar to that shown in FIG. 3. The noise in the signal does not correlate with the signal describing the frequency deviation nor with the data modulation used in the signal. When the signal output from the integrator is multiplied with a signal representing the data used in the data modulation in bipolar format, the effect of the data modulation is cancelled. This is due to the fact that both 1×1 and −1×−1 yield 1 as the product.

After this multiplication, the noise in the signal differs from the original noise. However, the statistic and frequency spectrum properties of the signal remain substantially intact. Thus, the product of the multiplication is a complex signal describing the frequency deviation which is either positive or negative, depending on the signal phase. Furthermore, there is some noise in the signal.

The present invention can also be applied in such a way that the above-described analysis by means of different clock phases of the guessed data is made as a part of the acquisition step to be performed in the acquisition block 6. Thus, it is possible to increase the coherent integration time over the duration of one data bit. Consequently, the acquisition sensitivity will increase with a few decibels. The acquisition block 6 must thus be restarted for each guessed data, or there are several copies of the acquisition block 6 operating in parallel fashion, experimenting different guessed data in the receiver.

After determining the correct frequency deviation and code phase, the receiver can be set in a tracking mode. With the weakest signals, data reception will not be successful, but, in a way known as such, one must turn to data obtained e.g. via a mobile communication network. Distance measuring is still possible with the reduced accuracy. In the selection block 9, the tracking mode is set by selecting, for the numerically controlled oscillator 5, a control value which substantially corresponds to the determined frequency deviation, and for the reference code of the reference code generator 34, a code phase which substantially corresponds to the determined code phase. Furthermore, by means of the symbol clock determined by the precision acquisition block 33, the phase of the clock signal used in the data demodulation can be initialized to be substantially the same as the real phase of the data transmitted in the received signal. This is preferably performed in a data clock reconstruction block 37. The received information is now led from the integrator 36 to the loop filter 11, in which also a feedback is formed, e.g. for the continuous fine tuning of the frequency of the numerically controlled oscillator 5.

In the above-presented receiver, the converter block 2, the digitizing block 3 and the acquisition block 6 may be common to all the receiving channels, but there can be several integrators 36 for each channel, even though, for the sake of clarity, only one integrator and one receiving channel are shown in FIG. 1.

It is obvious that the present invention is not limited solely to the above-presented embodiments, but it can be modified within the scope of the appended claims.

What is claimed is:

1. A method for synchronizing a receiver with a transmitted signal modulated with a spreading code and further modulated with information to be transmitted, the method comprising:

determining a frequency shift of the transmitted signal and the symbol acquisition of the data transmission, forming guessed data representing a guess of the information to be transmitted, multiplying the received signal with at least two different values of said guessed data to form spectrum results, determining the frequency shift on the basis of the spectrum results formed with said different guessed data, and using the determined frequency shift to set an oscillator for synchronizing the receiver.

2. A method according to claim 1, wherein further at least two different phase shifts are selected for the guessed data, wherein the spectrum results are computed for the different guessed data with each phase shift of the guessed data.

3. A method according to claim 1, wherein in each spectrum result, the highest maximum is searched for, and the highest maxima searched for in the different spectrum results are compared, wherein the frequency shift is determined on the basis of the highest maximum which is the greatest of said highest maxima.

4. A method according to claim 1, which comprises a first acquisition step to find out the rough frequency shift of the signal and the acquisition of the spreading code and a second acquisition step, in which the received signal is multiplied with said guessed data, wherein the more precise frequency shift and the symbol acquisition of the data transmission are determined on the basis of the formed spectrum results.

5. A method according to claim 1, wherein the received signal is multiplied with said guessed data after the rough frequency shift of the signal and the acquisition of the spreading code, wherein several different guessed data are formed, and several determinations of the frequency shift and the symbol acquisition of the data transmission are performed, one of said several different guessed data being used in each.

6. A receiver comprising acquisition means for acquisition of a signal modulated with a spreading code and further modulated with information to be transmitted, and determining means for determining the frequency shift of the signal and the symbol acquisition of the data transmission, the receiver also comprising means for generating guessed data representing a guess of the information to be transmitted, means for multiplying the received signal with at least two different values of said guessed data to form spectrum results, and means for determining the frequency shift on the basis of the spectrum results formed with said different guessed data.

7. A receiver according to claim 6, which comprises means for selecting at least two different phase shifts for the guessed data, wherein the spectrum results are arranged to be computed for the different guessed data with each phase shift of the guessed data.

8. A receiver according to claim 6, which comprises means for searching for the highest maximum in each spectrum result, and means for comparing the highest maxima searched in different spectrum results, wherein the frequency shift is arranged to be determined on the basis of the highest maximum which is the highest of said highest maxima.

9. A receiver according to claim 6, which comprises an acquisition block for determining the rough frequency shift of the signal and the acquisition of the spreading code, and a precision acquisition block with means for multiplying the received signal with said guessed data and means for determining the further defined frequency shift and the symbol acquisition of the data transmission on the basis of the formed spectrum results.

10. A receiver according to claim 6, wherein the multiplication of the received signal by said guessed data is arranged to be performed after the acquisition of the rough frequency shift of the signal and the spreading code, wherein the receiver comprises means for generating several different guessed data, and two or more acquisition blocks which are each provided with means for determining the frequency shift and the acquisition of the spreading code by using one of said several different guessed data.

11. A wireless communication device comprising at least one receiver which comprises acquisition means for acquisition of a signal modulated with a spreading code and further modulated with information to be transmitted, and determining means for determining the frequency shift of the signal and the symbol acquisition of the data transmission, the wireless communication device also comprising means for generating a guessed data representing a guess of the information to be transmitted, means for multiplying the received signal by at least two different values of said guessed data to form spectrum results, and determining means for determining the frequency shift on the basis of the spectrum results formed with said different guessed data.

* * * * *